July 19, 1960 LA VERNE A. PRYER 2,946,003
PORTABLE TESTER FOR REGULATORS AND GENERATORS
Filed Aug. 24, 1956
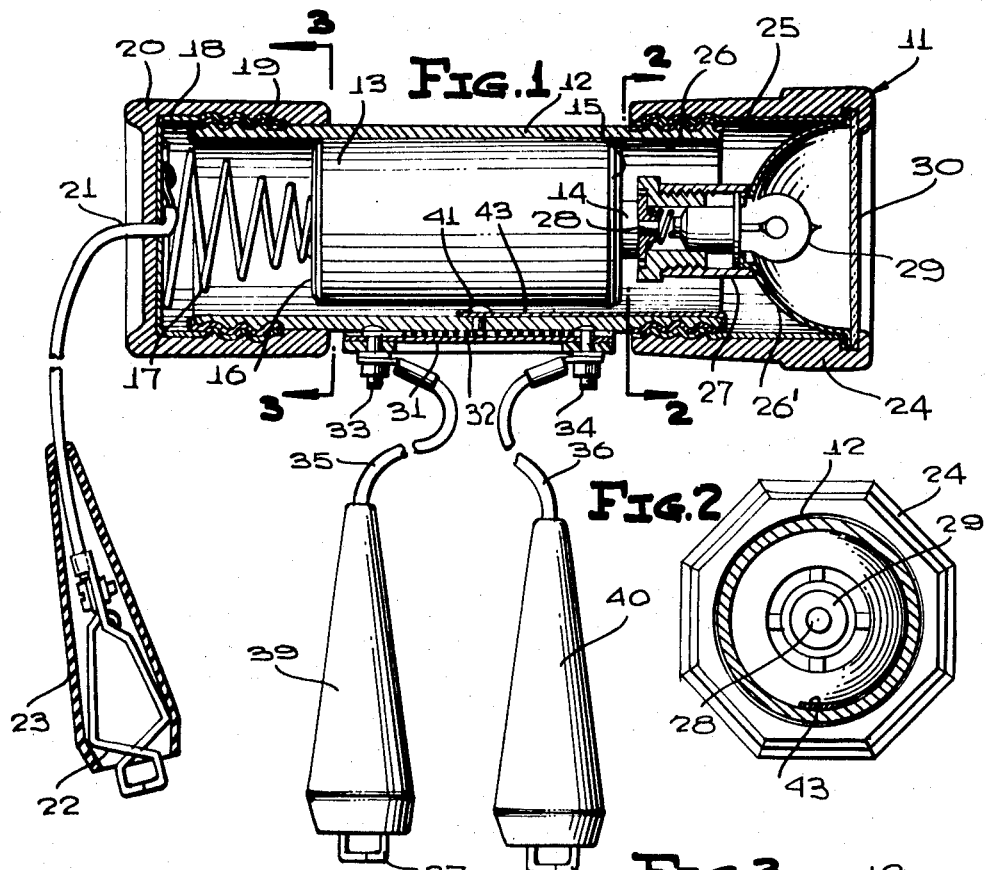
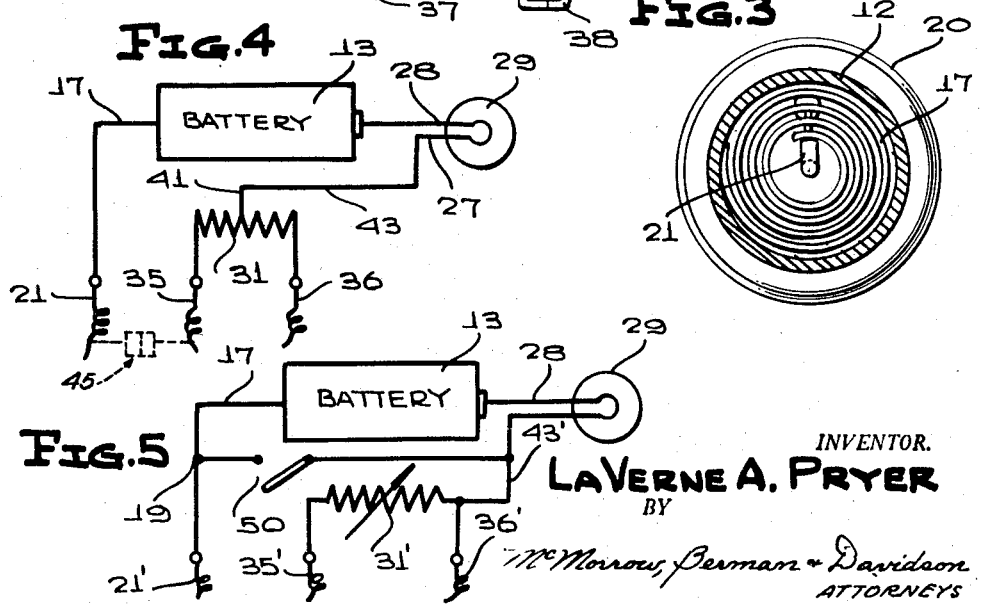
INVENTOR.
LaVerne A. Pryer
BY
McMorrow, Berman & Davidson
ATTORNEYS

2,946,003

PORTABLE TESTER FOR REGULATORS AND GENERATORS

La Verne A. Pryer, 867 Wayne St., Jackson, Mich.

Filed Aug. 24, 1956, Ser. No. 606,006

1 Claim. (Cl. 324—53)

This invention relates to electrical testing apparatus, and more particularly to a portable electrical resistance tester especially useful in testing regulators and generators as employed in automobiles, aircraft, or the like.

A main object of the invention is to provide a novel and improved electrical resistance tester which is particularly useful in testing voltage regulators, generators, and similar electrical components associated with internal combustion engines, the tester being simple in construction, being easy to use, and enabling a mechanic to rapidly detect defects in low resistance circuits, for example, bad voltage regulator contacts, and also enabling a mechanic to rapidly distinguish between various low resistance circuit conditions, for example, to distinguish between different types of voltage regulators wherein the circuit arrangements present different low resistance conditions at the terminals of the device under test.

A further object of the invention is to provide an improved low resistance testing device which involves inexpensive components, which is compact in size, which is sturdy in construction, and which eliminates the necessity of employing sensitive and expensive voltmeters or similar delicate apparatus in performing simple resistance tests on equipment such as voltage regulators, generators, or the like, as employed in connection with motor vehicle or aircraft engines, or with similar internal combustion engines.

Further objects and advantages of the invention will become apparent from the following description and claim, and from the accompanying drawings, wherein:

Figure 1 is a longitudinal vertical cross sectional view taken through an improved electrical resistance tester constructed in accordance with the present invention.

Figure 2 is a transverse vertical cross sectional view taken on the line 2—2 of Figure 1.

Figure 3 is a transverse vertical cross sectional view taken on the line 3—3 of Figure 1.

Figure 4 is a schematic wiring diagram showing the electrical connections of the tester illustrated in Figures 1 to 3.

Figure 5 is a schematic circuit diagram showing a modified form of electrical tester constructed in accordance with the present invention.

Referring to the drawings, and more particularly to Figures 1 to 4, 11 generally designates an electrical resistance tester according to this invention, said tester comprising a generally cylindrical housing 12 of insulating material in which is positioned a conventional flashlight battery 13, said battery having the positive center terminal pole 14 and the usual metallic casing constituting the negative pole of the battery. For reasons which will presently become apparent, the battery 13 is preferably provided with an insulating jacket 15 which covers the main body portion of the battery leaving the end portion 16 of the battery casing exposed, said end portion being engaged by a contact spring 17, as shown. Secured on the end portion of the main housing 12 adjacent the exposed end of the battery casing is a metal band 18 formed with outwardly facing screw threads, and engaged on the screw threads of the band 18 is a metal cap 19 secured inside the insulating end cap 20 of rubber or of other suitable insulating material. As shown in Figure 1, the contact spring 17 engages the end wall of the metal cap 19. Electrically connected to said end wall is one end of a terminal wire 21 which passes through a central aperture provided in each of the metal cap 19 and the insulating cap 20. The terminal wire 21 is provided at its outer end with a terminal clip 22 and with a conventional protective sleeve 23 of rubber or other suitable resilient deformable material, allowing the terminal clip 22 to be manipulated without manual electrical contact therewith.

Mounted on the end of the housing 12 opposite cap 20 is an annular cap member 24 of suitable insulating material, such as rubber or the like, said annular cap member having the conductive metal lining 25 which is formed with internal screw threads engaging on a metal band 26 secured on the end of the body 12 and formed with screw threads to interengage with the screw threads of the metal lining member 25. Mounted in the cap member 24 is the metal reflector 26' to which is secured a conventional flashlight lamp socket 27 arranged axially, as shown, and provided with a center contact 28 adapted to engage the positive center contact 14 of the flashlight battery 13. A lamp 29 is mounted in the socket 27 in the usual manner so that its center contact is electrically connected to the battery center contact 14. The base shell of the lamp 29 is electrically connected through the shell of socket 27 and the metallic reflector 26' to the metal lining 25, and is thus connected electrically to the band 26. A transparent lens 30 is provided on the member 24 in engagement with the rim of reflector 26', as shown.

The inside surface of reflector 26' is preferably darkened, as by the use of a suitable paint, so that the relative degree of illumination of the lamp 29 may be readily estimated by the contrast between the lamp 29 and the darkened background provided by the interior surface of the reflector 26'.

In actuality, the member 26' does not operate as a reflector but as a background means to enable the user to judge the degree of illumination of the lamp 29. However, the member 26' may be formed from a conventional flashlight reflector, since it is of a suitable shape to centrally receive the lamp bulb 29.

Secured on the intermediate portion of the main housing 12 is a relatively flat resistor 31 of substantial exposed area and of relatively low resistance when cold, said resistor comprising, for example, a plurality of turns of resistance wire wound on a flat strip of insulating material over which is placed a thin layer of transparent insulating material, such as a thin piece of mica, shown at 32. The ends of the resistance winding are fastened to respective terminals 33 and 34, to which are connected respective flexible terminal wires 35 and 36 provided at their free ends with the terminal clips 37 and 38 and with the flexible insulating terminal clip covers 39 and 40, similar to the terminal clip cover 23.

The resistor 31 has a center terminal 41, which may comprise a rivet, or similar fastener, as illustrated in Figure 1, in electrical contact with the central point of the resistance winding, and extending through the wall of housing 12. The fastener 41 extends through and is electrically connected to a conductive strip 43 electrically connected to the metal band 26, for example, a tongue formed integrally with said metal band and bent back along the inside surface of the housing 12, as shown. Thus, the shell of the lamp 29 is electrically connected to the center of the resistance 31.

Resistance 31 is of relatively low value when cold, but is of sufficient value when heated to prevent an excessive amount of current flowing therethrough when placed across the output of an automobile generator and thereafter maintained connected thereto. However, under such conditions a sufficient amount of current will flow through the resistor so that the resistor will develop an appreciable rise in temperature which may be manually detected.

The lamp 29 has a substantially higher voltage rating than the voltage of the battery 13. For example, the lamp 29 may have a voltage rating of 2.4 volts, whereas the battery has an output voltage of 1.5 volts. Therefore, the lamp is never energized at full brilliance, and is energized at only partial brilliance when connected in circuit with the battery and the resistor 31.

From Figure 4, it will be apparent that when the wires 21 and 35 are electrically connected together as by touching the terminal clips 22 and 37 together, the lamp 29 will become energized and will glow at a definite brilliance. The same will occur when the terminal clips 22 and 38 are connected together. If there is any appreciable resistance in the circuit including the lamp 29, the battery 13 and either half of the resistor 31, the intensity of illumination of lamp 29 will decrease perceptibly. Thus, in testing the condition of a pair of contact points, such as the contact points of a voltage regulator, the operator first connects the contact terminals 22 and 37 across the contact points to be tested, providing illumination of the lamp 29 if the contact points make non-resistive electrical contact with each other. Thus, as shown in Figure 4, the contact points, shown at 45, connect the terminal wires 21 and 35 and establish an energizing circuit for the lamp 29 comprising battery 13, the center contact 28 of the lamp socket, the lamp filament, the shell 27, the connecting strip 43, the center cap element 41, the left half of resistor 31, the terminal wire 35, the contact points 45, the terminal wire 21, and the casing of the battery. The clip 38 is now touched against the clip 22 so as to make electrical contact therewith. If the lamp 29 brightens in intensity, this indicates that the contact points 45 have substantial resistance and should be cleaned.

As the lamp is illuminated at all times during the above test the slightest change in intensity will be noticeable.

The value of resistance of resistor 31 is very low when said resistor is in a cold state, and offers practically no opposition to current flow. The value of resistance of resistor 31 is so low that touching contact clip 38 to contact clip 22 will not perceptibly affect the illumination of the lamp bulb unless the item under test has appreciable resistance.

A similar procedure may be employed to identify the type of circuit of a voltage regulator, or similar device to be tested. If the circuit tested has appreciable resistance, there will be a perceptible difference in brilliance of the lamp 29 between the conditions wherein the circuit is first connected between the terminal clips 22 and 37 and the subsequent condition when terminal clip 38 is connected to terminal clip 22, as above described. In this manner, a mechanic may readily distinguish between a "standard duty" type of voltage regulator, wherein the regulator contact points are connected between the "field" terminal and ground and a "heavy duty" type of voltage regulator wherein the regulator points are connected between the "armature" terminal and the "field" terminal.

The resistance element 31 is employed to determine the presence of current in a source of current in a circuit across which the terminal clips 37 and 38 are connected, for example, between the output terminal and ground terminal of an automobile generator. If the generator is delivering current, the resistor 31 develops heat, which can be sensed by placing the thumb over the exposed area of the resistor, namely, against the mica protective element 32. The value of resistance of element 31 increases as it becomes hot.

Figure 5 illustrates a modified circuit which may be employed in the tester, said circuit including a variable resistor 31' of any suitable construction, said variable resistor having one terminal thereof connected to one of the flexible terminal wires, shown at 36' and to the shell of the lamp 29 as by a suitable conductor 43'. The other terminal of the resistor 31' is connected to a flexible terminal wire 35'. As in the previously described form of the invention, the remaining terminal wire, shown at 21' is connected to the casing of the flashlight battery 13 as by the contact member 17. A manually operated switch 50 is provided, connected between the conductors 43' and the conductive connecting elements 19 so that the lamp may be at times connected directly to the battery 13, providing maximum intensity of illumination. In using the circuit arrangement of Figure 5, the contacts or other circuit under test are connected between the terminal wires 21' and 35', as by suitable terminal clips provided on said wires, whereby the same illumination is obtained, if the contacts are clean, as would be obtained when the clips are connected together. A further manner of testing would be to connect the contacts or other circuit under test between the terminal wires 21' and 36', and then compare the illumination thus obtained with the illumination obtained when the switch 50 is closed.

Obviously, various other methods of using the tester will become apparent to those skilled in the art.

As in the previously described form of the invention, the resistor 31' may be employed as a means for detecting the presence of current in a circuit, for example, may be connected to the terminals of an automobile generator so that the current output of the generator is employed to develop heat in the resistor 31', which may be sensed by placing the thumb or other portion of the hand against the protective covering of the resistance winding 31', which may be of similar construction to the resistance winding shown in Figure 1. The resistance 31' may be made variable by the use of any well known means of resistance variations, for example, by the use of a sliding contact as employed in conventional rheostats, to provide a desired number of turns of resistance wire in the circuit to which the device is connected.

While certain specific embodiments of an improved testing device for testing electrical resistance and other characteristics of voltage regulators, automobile generators, or the like have been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A device for testing the electrical resistance of contact points comprising a housing, a flashlight battery in said housing, a lamp mounted at one end of the housing, said lamp having a substantially higher voltage rating than the voltage of said battery, whereby the lamp is energized at only partial brilliance when connected to the battery, a darkened background member mounted in said one end of the housing surrounding the lamp, said lamp and background member being exposed to view at said one end of the housing, whereby small differences in brilliance of said lamp in contrast with said background member may be detected readily, means connecting one terminal of said lamp to one pole of the battery, a first terminal member at the other end of the housing, means connecting said first terminal member to the other pole of the battery, a resistor of relatively low value mounted longitudinally on said housing, a second terminal member secured to said housing at one end of and being connected to said one end of said resistor, a third terminal member secured to the housing at the other end of and being connected to said other end of the resistor, said resistor being provided with a center terminal, means connecting the center terminal of said resistor to the remaining terminal of the lamp, and respective flexible test conductors connected to said first, second and third terminal members.

References Cited in the file of this patent

UNITED STATES PATENTS

| | | |
|---|---|---|
| 988,192 | Hetherington | Mar. 28, 1911 |
| 1,528,709 | Trimble | Mar. 3, 1925 |
| 2,041,614 | Lindsay | May 19, 1936 |
| 2,413,521 | Roskilly | Dec. 31, 1946 |
| 2,540,402 | Mosier | Feb. 6, 1951 |
| 2,564,166 | Marinello | Aug. 14, 1951 |
| 2,620,379 | Zimmerman | Dec. 2, 1952 |